United States Patent Office 3,423,477
Patented Jan. 21, 1969

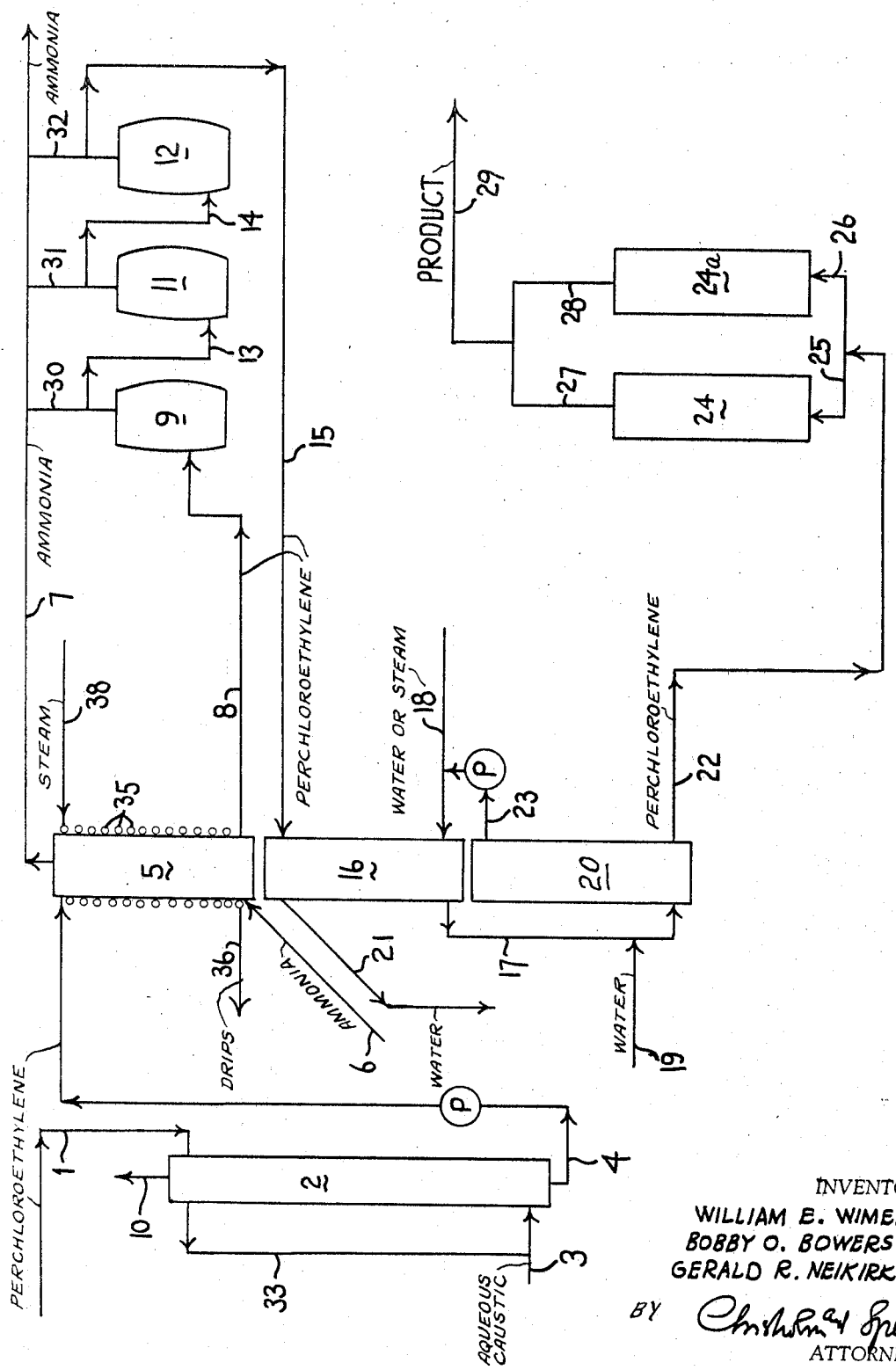

3,423,477
PURIFICATION OF PERCHLOROETHYLENE BY PROLONGED CONTACT WITH AMMONIA
William E. Wimer, New Martinsville, and Bobby O. Bowers, and Gerald R. Neikirk, Paden City, W. Va., assignors to PPG Industries, Inc., Pittsburgh, Pa., a corporation of Pennsylvania
Filed Dec. 22, 1965, Ser. No. 515,579
U.S. Cl. 260—654     11 Claims
Int. Cl. C07c *17/38*

ABSTRACT OF THE DISCLOSURE

Perchloroethylene which is acidic in nature is contacted with anhydrous ammonia and stored under an ammonia atmosphere at least eight hours. The ammonia treated perchloroethylene may then be water washed and dried. Prewashing with an aqueous caustic solution before ammonia treatment is disclosed.

---

The present invention relates to the production of perchloroethylene. More particularly, the present invention relates to a method of purifying perchloroethylene.

Perchloroethylene is a particularly useful material of commerce finding wide use as a dry cleaning and degreasing solvent. It is manufactured by the pyrolysis and chlorination of aliphatic hydrocarbons such as propane, by the dehydrochlorination and chlorination of tetrachloroethane and more recently by the oxychlorination of 1,2-dichloroethane, ethane or ethylene. A typical oxychlorination procedure is described in British Patent No. 904,084.

In all of these prior art methods of manufacture perchloroethylene is typically recovered in the pure state (99.5 percent by weight or above as perchloroethylene) by recourse to fractional distillation. While perchloroethylene of acceptable purity as regards chemical composition is attained it has been found that this material is often acidic in nature as recovered. In addition, when neutralized by conventional alkali washing techniques, it often develops acidity upon standing. This acidity formed upon standing is believed to be caused by organic acids which are either insoluble or only slightly soluble in aqueous solutions and/or by acid-forming organic materials which are either insoluble or only slightly soluble in aqueous solutions. Materials of this character are obviously not affected by the conventional alkali wash techniques. Because of these conditions recourse to specialized methods of treatment involving considerable expense have resulted. Thus, in U.S. Patent 2,888,495 an ion exchange resin treatment is described for the purpose of eliminating acidity in perchloroethylene.

While the process of the aforementioned patent has successfully reduced acidity in perchloroethylene it does involve the use of resin beds which is costly since they require not only resin but also maintenance and regeneration operations thus complicating the recovery of pure product perchloroethylene.

In accordance with the instant invention a simple, efficient method of purifying high purity (99.5 percent perchloroethylene by weight) is provided which eliminates acidity in such perchloroethylene. The treatment involved not only reduces acidity caused by inorganic or mineral acidic material but also reduces acidity which is present due to organic impurities such that the perchloroethylene after treatment can be stored without the problem of developing acidity occurring.

Thus, in practicing this invention high purity perchloroethylene is treated by subjecting it to contact with anhydrous ammonia, preferably in a countercurrent flow. The perchloroethylene after such a gas-liquid contact treatment is then stored for a period of at least 8 hours under an atmosphere of ammonia. After treatment under the ammonia atmosphere the perchloroethylene is washed and dried and is ready for stabilization and use.

For a more complete understanding of the instant invention reference is made to the accompanying drawing which is a diagrammatic illustration of a train suitable for use in practicing the present invention.

In the drawing high purity perchloroethylene taken from a product still is fed via line 1 to the top of an alkali scrubber 2. An aqueous caustic solution is fed via line 3 to the bottom of scrubber 2. The perchloroethylene that has been scrubbed in column 2 with the aqueous caustic solution is removed via line 4 and is essentially free of water soluble acid imparting substances at this point.

The perchloroethylene is then fed to column 5 via line 4, preferably at or near the top as shown. In column 5 perchloroethylene is contacted with an upwardly rising ammonia gas stream which is fed into the column 5 in the anhydrous state via line 6. Excess ammonia is removed from column 5 via line 7. The perchloroethylene after contact with the ammonia is removed via line 8 and is passed into a holding tank 9.

The perchloroethylene passed into tank 9 is then passed into tanks 11 and 12 via lines 13 and 14, respectively. The perchloroethylene from tank 12 is passed out of tank 12 via line 15 to the top of column 16. In column 16 the perchloroethylene is scrubbed with water or water and steam introduced in line 18 and the water scrubbed perchloroethylene is removed via line 17. In line 17 the perchloroethylene is mixed with water introduced via line 19 and the mixture of perchloroethylene and water are fed to the phase separator 20. In the water scrubber 16, the scrubbing water is conveniently removed as an overhead via line 21. In phase separator 20, the organic phase is removed via line 22 while the aqueous phase is removed via line 23 from which it is passed into line 18 as feed to the scrubber 16. The phase separated perchloroethylene removed from phase separator 20 via line 22 is passed through dryers 24 or 24a via lines 25 and 26, respectively. The dried perchloroethylene containing less than 40 parts per million $H_2O$ by weight is removed from dryers 24 or 24a via lines 27 and 28, respectively and is set to product storage via line 29. Each of the holding tanks 9, 11 and 12 are maintained with an atmosphere of ammonia therein which can be conveniently supplied via lines 30, 31 and 32 which are in communication with the vent line 7 and by the ammonia dissolved in this perchloroethylene removed from column 5 in line 8.

In a typical operation involving a train of equipment such as is illustrated in the drawing, a perchloroethylene stream from a finishing still and being at least 99.5 percent perchloroethylene by weight is fed to the column 2 where it is washed in countercurrent contact with an aqueous 10 percent by weight caustic solution introduced to the column through line 3. The scrubbed and neutralized perchloroethylene is then passed into column 5 which is a mild steel baffled tower. The perchloroethylene is fed at a convenient rate of 101 pounds per hour while dry ammonia is admitted to the tower through line 6 at the rate of 0.51 pounds per hour. The average retention time in the tower for the perchloroethylene feed is about 45 minutes. The perchloroethylene containing dissolved ammonia is then passed through the tanks 9, 11 and 12. Retention time in the system of tanks is at least 8 hours, preferably 16 to 24 hours.

After the storage or retention period the perchloroethylene is fed to the water scrubber at a rate of about 101 pounds per hour while water is passed in countercurrent contact with the perchloroethylene at the rate of about 810 pounds per hour. The scrubber 16 is preferably packed with Berl Saddles and the perchloroethylene retention time in the scrubber is about 20 minutes.

The finished perchloroethylene passes through the dryers at the 101 pound per hour rate upwardly through a bed of Grade F–1 alumina manufactured by Alcoa. This product has a bulk density of 51 pounds per cubic foot. Typically the perchloroethylene fed to the dryers contains 70 parts per million water and it is dried in the columns 24 or 24a to less than 40 parts per million.

In the operation of column 5 heat is supplied to the column via the coils 35 which are supplied with a heat exchange media, typically steam, which is fed via line 38 and removed via line 36 as water. The internal atmosphere of the column 5 is operated at typically 75° F. but may range between 50° F. to 150° F. The ammonia fed to the column similarly is subject to some variation as regards the quantity fed per unit of perchloroethylene fed. The weight ratio of ammonia to perchloroethylene may be varied between 0.001 to 1 to 0.01 to 1. Preferably the weight ratio of ammonia to perchloroethylene is in the range of 0.003 to 1 to 0.007 to 1. The column 5 is preferably operated under pressure during ammonia treatment for example 10 to 50 p.s.i.g. but operation at atmospheric conditions of pressure has been found to be acceptable.

In the retention tanks 9, 11 and 12 the temperatures are normally ambient (about 75° F.) and pressures are typically atmospheric. Recourse to higher or lower temperatures may be had by installing heat transfer equipment if higher or lower temperatures are desired in these vessels. Similarly pressure can be applied above the atmospheric pressure utilized in the preferred embodiment if desired.

The water fed to column 16 is in the preferred mode of operation heated. Thus, warm water washing of the perchloroethylene entering column 16 is the preferred manner of operating this wash system. Typically the water entering column 16 will range in temperature between 80° F. to 170° F. and under preferred operating conditions is maintained between 100° F. and 150° F. This column is preferably a packed column but baffle plate columns and other similar equipment designed to thoroughly mix fluids during passage through a column may be employed.

While the dryers employed utilized an alumina material as a desiccant, this being the preferred material, recourse to other known desiccants or to distillation and/or absorbent techniques for the removal of water may be had.

The pre-alkaline wash undertaken in column 2 is typically carried out under atmospheric pressure at ambient temperature (75° F.). This temperature of operation of course is variable and may range generally between 50° F. to 170° F. While a 10 percent by weight sodium hydroxide solution is preferred for this wash, the concentration may be varied considerably if desired. Typically it will range between 5 and 20 percent by weight alkali metal hydroxide. Similarly, the column if it is desirable may be operated under superatmospheric conditions of pressure.

Phase separator 23 is preferably operated under atmospheric pressure and at ambient temperature (75° F.) but could where found desirable be operated under superatmospheric pressures and at temperatures above or below the ambient.

While the invention has been described with reference to certain illustrative embodiments, it is not intended that it be limited thereby except insofar as appears in the accompanying claims.

What is claimed is:
1. A method of reducing the acidity of high purity liquid perchloroethylene comprising contacting said liquid perchloroethylene with gaseous anhydrous ammonia in a gas-liquid contact zone, passing the so-contacted liquid perchloroethylene from said zone to a storage zone, storing said liquid perchloroethylene for a period of at least 8 hours under an atmosphere of gaseous ammonia, washing the so-stored liquid perchloroethylene with water and subsequently drying it to reduce its water content.

2. The method of claim 1 wherein said gas-liquid contact zone is at a temperature of about 50° F. or greater and the weight ratio of ammonia to perchloroethylene ranges between 0.001 to 1 to 0.01 to 1.

3. The method of claim 2 wherein said gas-liquid contact zone is operated under a pressure of between 10 to 50 p.s.i.g.

4. The method of claim 1 wherein said washing step comprising washing said perchloroethylene after storage with water at temperatures between 80° F. to 170° F.

5. A method of reducing the acidity of a high purity liquid perchloroethylene stream comprising introducing said liquid perchloroethylene into a gas-liquid contact zone, passing gaseous anhydrous ammonia into said gas-liquid contact zone and in contact with said liquid perchloroethylene, removing the so-contacted liquid perchloroethylene from said gas-liquid contact zone and feeding it to a storage zone, retaining said liquid perchloroethylene fed to the storage zone therein for a period of at least 8 hours while providing an ammonia atmosphere in said storage zone for said period, passing the so-stored liquid perchloroethylene to a liquid-liquid contact zone, scrubbing said liquid perchloroethylene in said liquid-liquid contact zone with warm water, phase separating said water and said liquid perchloroethylene, feeding the liquid perchloroethylene which has been phase separated from water through a bed of desiccant to remove water therefrom and recovering liquid perchloroethylene product from said bed.

6. The method of claim 5 wherein said desiccant is alumina.

7. The method of claim 5 wherein said gas-liquid contact zone is operated at a temperature above about 50° F. and said liquid-liquid contact zone is operated at temperatures between 50° F. and 150° F.

8. The method of claim 5 wherein said liquid-liquid contact zone is heated by feeding steam thereto with the water feed.

9. The method of claim 5 wherein said gas-liquid contact zone has a weight ratio of ammonia to perchloroethylene between 0.001 to 1 to 0.01 to 1 maintained therein during operation.

10. The method of claim 7 wherein said gas-liquid contact zone has a weight ratio of ammonia to perchloroethylene between 0.001 to 1 to 0.01 to 1 maintained therein during operation.

11. The method of claim 5 wherein liquid perchloroethylene is contacted with aqueous caustic solution prior to contacting said liquid perchloroethylene with gaseous anhydrous ammonia.

References Cited
UNITED STATES PATENTS
2,025,024   11/1963   Britton et al. _____ 260—654

FOREIGN PATENTS
1,161,876   1/1964   Germany.

LEON ZITVER, Primary Examiner.
J. BOSKA, Assistant Examiner.